United States Patent [19]

Isono et al.

[11] Patent Number: 4,920,430
[45] Date of Patent: Apr. 24, 1990

[54] METHOD OF AND APPARATUS FOR JITTER CORRECTION OF A POLYGON MIRROR IN AN IMAGE RECORDING APPARATUS

[75] Inventors: Koichi Isono, Otsu; Kunio Tomohisa, Kyoto; Junichi Oka, Hikone; Takashi Sakamoto, Otsu, all of Japan

[73] Assignee: Dainippon Screen Mfg. Co., Ltd., Kyoto, Japan

[21] Appl. No.: 353,850

[22] Filed: May 18, 1989

Related U.S. Application Data

[62] Division of Ser. No. 113,743, Oct. 28, 1987, Pat. No. 4,872,065.

[30] Foreign Application Priority Data

Oct. 29, 1986 [JP] Japan ........................... 257727
Nov. 21, 1986 [JP] Japan ........................... 61-279288

[51] Int. Cl.⁵ ............................................. H04N 1/04
[52] U.S. Cl. .................................. 358/481; 358/494
[58] Field of Search ............ 358/160, 409, 410, 412, 358/413, 481, 158, 474, 494

[56] References Cited

U.S. PATENT DOCUMENTS

| | | | |
|---|---|---|---|
| 4,270,131 | 5/1981 | Tompkins et al. | 358/481 |
| 4,320,420 | 3/1982 | Rider | 358/412 |
| 4,400,740 | 8/1983 | Traino et al. | 358/474 |
| 4,600,945 | 7/1986 | Bolger | 358/160 |
| 4,635,000 | 1/1987 | Swanberg | 358/412 |
| 4,803,367 | 2/1989 | Murase et al. | 358/481 |

FOREIGN PATENT DOCUMENTS 0119963 7/1984 Japan ............................. 358/474

Primary Examiner—James J. Groody
Assistant Examiner—David E. Harvey
Attorney, Agent, or Firm—Lowe, Price, Leblanc, Becker & Shur

[57] ABSTRACT

A clock generator (15) and a delay circuit (16) create N dot recording clock signals ($\phi_1$ to $\phi_N$) of a cycle t, delayed by t/N. A counter (20) counts a detecting time interval between a start sensor (12) and an end sensor (14) for every surface of a polygon mirror (8) to generate time resolution t/N. The difference between the count value and a reference count value set in a latch (24) is input to a subtracter (23), so that a translation table (28) outputs clock crossover timing responsive to the difference. A latch (17) and an encoder (18) select an N dot recording clock signal synchronous with detection output of the start sensor (12) for every surface of the polygon mirror (8). A second selector (33) outputs a crossover dot recording clock signal ($\phi_X$) for image recording by performing crossover from the selected dot recording clock signal to other dot recording clock signals that are sequentially along the clock crossover timing.

8 Claims, 15 Drawing Sheets

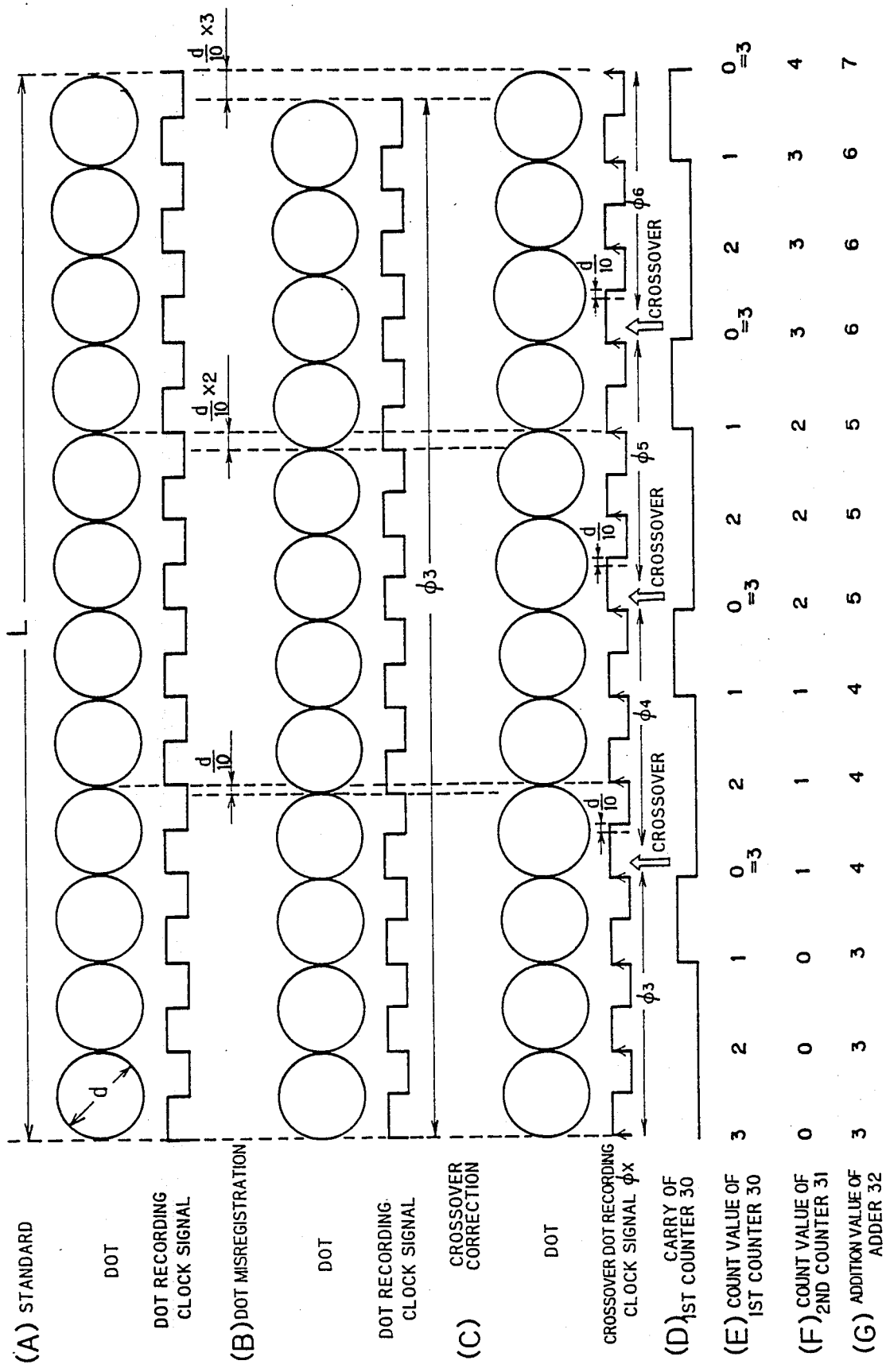

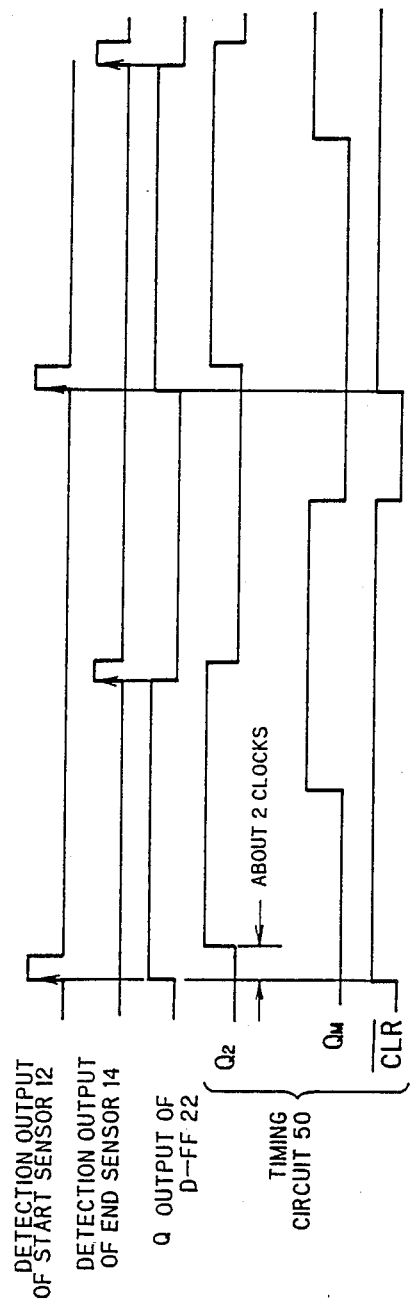

METHOD OF AND APPARATUS FOR JITTER CORRECTION OF A POLYGON MIRROR IN AN IMAGE RECORDING APPARATUS

This is a division of application Ser. No. 07/113,743, filed on Oct. 28, 1987, now U.S. Pat. No. 4,872,065.

BACKGROUND OF THE INVENTION

1. Field of the Invention

The present invention relates to a method of and an apparatus for jitter correction of a polygon mirror in order to reduce dot misregistration in scanning lines caused by rotational errors of the polygon mirror in an image recording apparatus such as a flat scanning type facsimile or electronic process scanner, and for performing image recording by scanning recording beams modulated in response to variable density levels (including black and white) of respective dots in synchronization with dot recording clock signals by a polygon mirror on a photosensitive material such as a photographic paper or a film.

2. Description of the Prior Art

In a flat scanning type image recording apparatus employing laser beams as recording beams, a polygon mirror is generally used as a scanning deflector for the laser beams. However, the polygon mirror inevitably creates rotational errors whereby scanning lengths vary with respective reflecting mirror surfaces of the polygon mirror to cause dot misregistration in scanning lines, as shown in FIG. 1. Although the start positions of respective scanning lines are substantially registered or even in the figure, dot misregistration or unevenness by a distance corresponding to ½ dot occurs as compared to a correct scanning length L in the end position of the second scanning line. Such dot misregistration deteriorates the picture quality of the recorded image. Particularly an electronic process scanner for duplicating halftone images is adapted to record regular halftone images (halftone dot patterns), and hence misregistration of even ½ dot significantly deteriorates the picture quality.

In general, dot misregistration in scanning lines caused by rotational errors of a polygon mirror has been corrected as follows:

A first method employs grating (linear encoding). In this method, a grating laser is assembled in the same optical system with a recording laser. These laser beams are deflected by a polygon mirror that performs exposure recording/scanning by the recording laser beam while grate scanning the grating laser beam to obtain pulse signals indicating positions of the recording laser beam. Dot misregistration in the respective scanning lines is eliminated by creating dot recording clock signals synchronous with the pulse signals through a synchronous control circuit such as a PLL circuit. Although dot misregistration is eliminated by this method, the optical system is complicated since the grating laser beam is assembled in the optical system. Adjustment is complicated and the PLL circuit is increased in cost when high resolution and high frequency are required.

In a second method, a crystal oscillator is combined with a start sensor. This method employs a polygon mirror of high accuracy as a deflector with a reference clock signal generated by the crystal oscillator creating a plurality of clock signals by delaying the reference clock signal by appropriate times, synchronizing the clock signal with a recording laser beam and start sensor in order to process the same as a dot recording clock signal in the corresponding scanning line, and thereby to register the start positions of respective scanning lines. A main scanning synchronous system in this method is simple in structure and hence the same can be relatively easily adjusted, and manufactured at a relatively low cost. In this method, however, the polygon mirror is inherently inferior in accuracy to the crystal oscillator and the start sensor. Thus, although the respective scanning lines substantially coincide in timing with each other without dot misregistration immediately after starting, dot misregistration is inevitably caused by slight rotational errors of the polygon mirror in the vicinity of the end positions, causing terminating ends of the scanning lines to be irregularized. Even when a polygon mirror of higher accuracy is attained in order to prevent this irregularization, such attempts are restricted by both cost and technical limitations.

A third method is adapted to modulate the frequency of a dot recording clock signal in response to rotational errors. This method analogously obtains voltage responsive to the rotational speed of the polygon mirror to perform voltage-frequency (V-F) conversion of the same in order to generate the dot recording clock signal, while digitally generating a reference clock signal to frequency-divide the reference clock signal in a frequency dividing ratio responsive to the rotational speed of the polygon mirror, thereby generating the dot recording clock signal. However, this method requires voltage ratio values of high accuracy, and selection. When the wanted frequency is finely changed in the latter method adjustment of the frequency is difficult.

SUMMARY OF THE INVENTION

The present invention is directed to a method of and an apparatus for jitter correction of a polygon mirror for a scanning recording beam modulated in synchronization with a dot recording clock signal on a photosensitive material performing image recording.

According to the present invention, a start sensor for detecting a recording beam in advance to scanning of one scanning line and an end sensor for detecting passage of the recording beam upon completion of scanning of one scanning line are provided while N dot recording clock signals obtained by delaying a dot recording clock signal of a cycle t by t/N are previously prepared.

In a first mode of the present invention, an interval between detecting times when the beam cross the two sensors is counted in time resolution t/N every one surface of a polygon mirror to obtain the difference between the count value and a prescribed reference count value as a resulting clock crossover number; a sign of the difference as a crossover phase direction, and one of the N dot recording clock signals is selected in synchronization with detection output of the start sensor for every surface of the polygon mirror, thereby to perform image recording by a crossover dot recording clock signal obtained by performing crossover from the selected dot recording clock signal to dot recording clock signals adjacent in phase sequentially in the crossover phase direction by the crossover number.

In other words, the first mode employs the aforementioned second conventional method for registering start positions of respective main scanning lines but eliminates dot misregistration of the scanning lines caused by rotational errors of the polygon mirror by performing crossover operation of the N dot recording clock signals delayed by t/N number of times responsive to the amount of dot misregistration during scanning of one scanning line.

In a second mode of the present invention, a detection time interval between the start sensor and the end sensor is counted in time resolution t/N through the N dot recording clock signals to obtain rotational error times for respective surfaces of the polygon mirror thereby performing image recording by dot recording clock signals phase-shifted in a direction for reducing dot misregistration caused by the errors by a period about half the respective error times with respect to respective surfaces.

Namely, in the second mode, the amounts of dot misregistration in the scanning lines caused by rotational errors of the polygon mirror are suppressed to about one half of maximum and disperses the amounts over the entire set of scanning lines (particularly in the vicinity of both ends) thereby reducing the overall misregistration.

Accordingly, an object of the present invention is to overcome the aforementioned problems of the prior art and provide a method of and an apparatus for jitter correction of a polygon mirror, which can substantially eliminate or reduce dot misregistration of scanning lines caused by rotational errors of the polygon mirror in simple structure, without providing grating technique or a synchronous control circuit and without requiring a polygon mirror of high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an explanatory diagram showing the basic concept of a first embodiment of the present invention;

DESCRIPTION OF THE PREFERRED EMBODIMENTS

First Embodiment

With reference to FIG. 2, description is now set forth according to a first embodiment of the present invention. FIG. 2(A) shows a dot train formed on a standard scanning line with no dot misregistration and a dot recording clock signal for forming the dot train, on the assumption that one scanning line of standard scanning length L is formed by 12 dots (for convenience of illustration). On the other hand, FIG. 2(B) shows the case where the average rotational speed on a reflecting mirror surface is delayed by approximately 2.5% (1/40) with respect to the standard level, by a rotation error of a polygon mirror or the like and dot misregistration of $(d/10) \times 3$ is caused at the terminating end of the scanning line. The start position of the scanning line is correct by employment of, e.g., the aforementioned second conventional method. Both of the cases of FIGS. 2(A) and 2(B) require the same time for 12 cycles of the dot recording clock signals, whereas the scanning length in the said time is shorter than the standard scanning length L in the case of FIG. 2(B) as the result of delay in scanning speed. Symbol d denotes a standard dot diameter. Although the dot diameter is illustrated as equal to a dot interval, the dot diameter is generally larger than the dot interval for exposure/recording. The following description is made on the assumption that the dot diameter is equal to the dot interval. In the case of FIG. 2(B), dot misregistration of d/10 is caused every four dots of the dot train, and the dot misregistration at the 12th dot in the terminating end of the scanning line is $(d/10) \times 3$.

Figure 3:
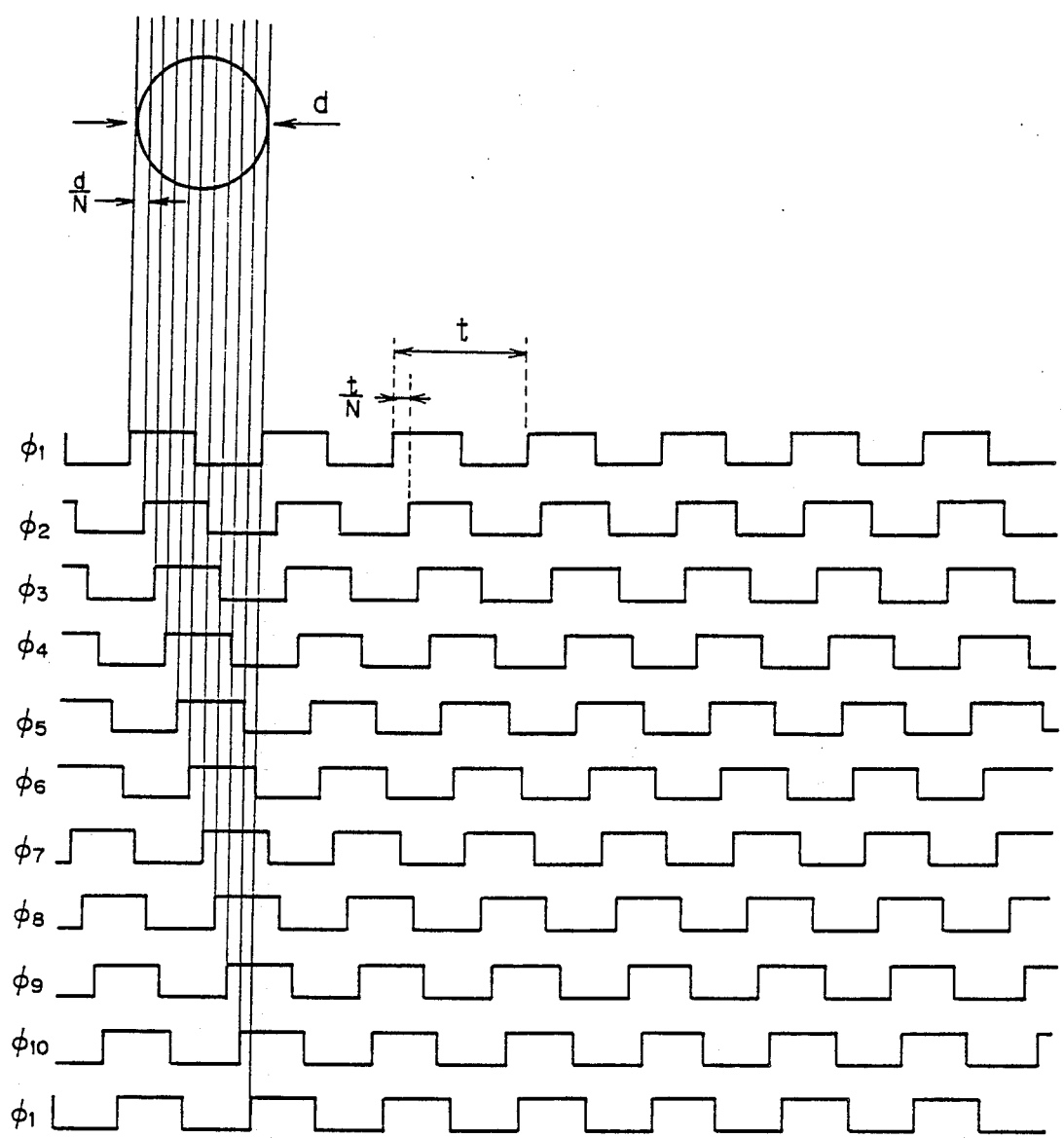
FIG. 3 illustrates relation between one dot and delayed dot recording clock signals.

FIG. 2(C) shows a case where crossover correction according to the present invention is performed in scanning of FIG. 2(B) to eliminate the dot misregistration. In order to perform such crossover correction, N dot recording clock signals $\phi_1$ to $\phi_N$ are previously prepared in the present invention by equally dividing the period t of a reference dot recording clock signal $\phi_1$ into N to delay the same by 1/N as shown in FIG. 3. FIG. 3 illustrates an example in the case of N=10. As hereinafter described, time resolution adjustable by crossover correction of these dot recording clock signals $\phi_1$ to $\phi_N$ is t/N, and length resolution is d/N (in case of standard scanning speed).

Figure 1:
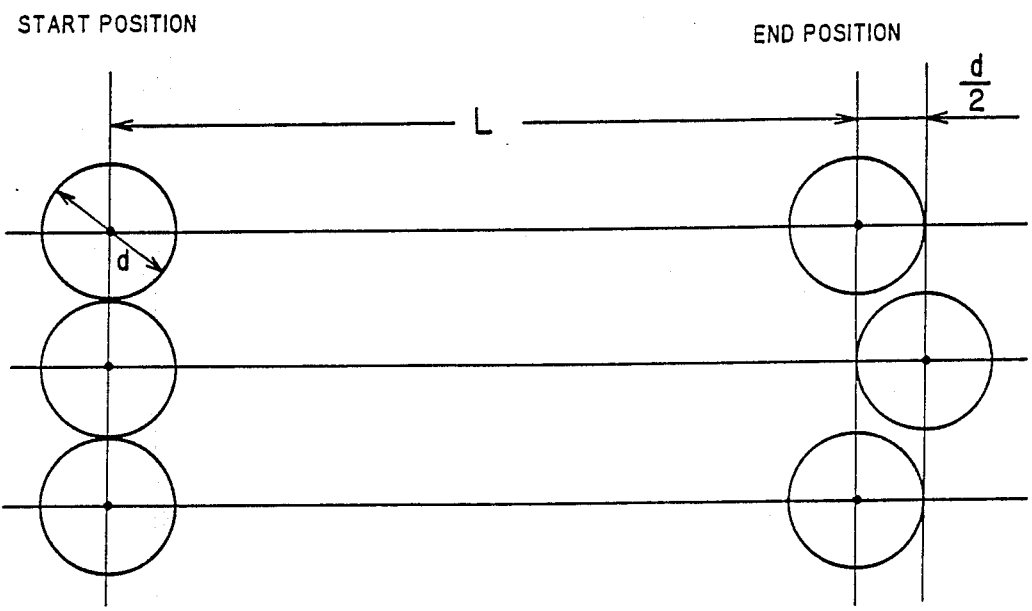
FIG. 1 illustrates the result of dot misregistration in a conventional method.
Figure 4:
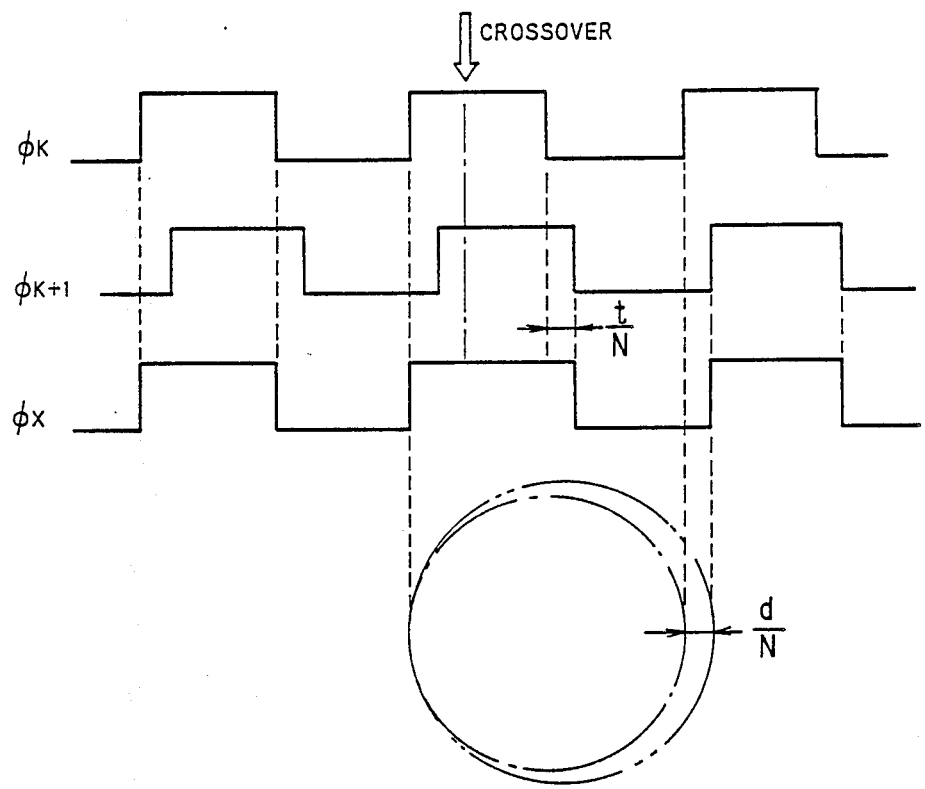
FIG. 4 is an explanatory diagram of crossover of dot recording clock signals.

FIG. 4 is an explanatory diagram showing crossover correction of the dot recording clock signals. In this case, crossover is performed from a dot recording clock signal $\phi_K$ within the N signals to a phase-lagging dot recording clock signal $\phi_{K+1}$ adjacent to $\phi_K$ in timing as shown by an arrow in the figure, to obtain a crossover dot recording clock signal $\phi_X$. In the cycle where crossover of the crossover dot recording clock signal $\phi_X$ is performed, the pulse time width is lengthened by t/N, whereby the dot diameter formed in the cycle is larger by d/N than the standard diameter. Thus, as compared with the scanning length only by the dot recording clock signal $\phi_K$, the scanning length by the crossover dot recording clock signal $\phi_X$ obtained by crossover of $\phi_K$ to $\phi_{K+1}$ is large by d/N. When crossover is performed toward a phase-leading side as $\phi_K$ to $\phi_{K-1}$ to the contrary, the scanning length is shorter by d/N. Thus, the scanning length can be adjusted in a multiple of d/N by performing a plurality of times of crossover in a scanning interval for one scanning line.

Referring again to FIG. 2, it is assumed that scanning causing the dot misregistration of FIG. 2(B) is performed in synchronization with $\phi_3$ within previously prepared ten dot recording clock signals $\phi_1$ to $\phi_{10}$. In the crossover correction of the present invention shown in FIG. 2(C), operation is started from the dot recording clock signal $\phi_3$ for performing crossover of the dot recording clock signals sequentially in the phase lag direction as $\phi_3 \rightarrow \phi_4 \rightarrow \phi_5 \rightarrow \phi_6$ three times before completion of scanning in order to create the crossover dot recording clock signal $\phi_X$, and thereby perform scanning synchronously with the same. Namely, adjustment is so performed that the scanning length is lengthened by d/10 per cycle of the crossover shown by arrows in the figure, whereby the dot misregistration of (d/10)×3 caused in the case of FIG. 2(B) is completely eliminated at the terminating end of the scanning line. Further, adjustment of the dot misregistration is uniformly dispersed over one scanning line, whereby no unnaturalness is caused in the dot train thus obtained.

Figure 5:
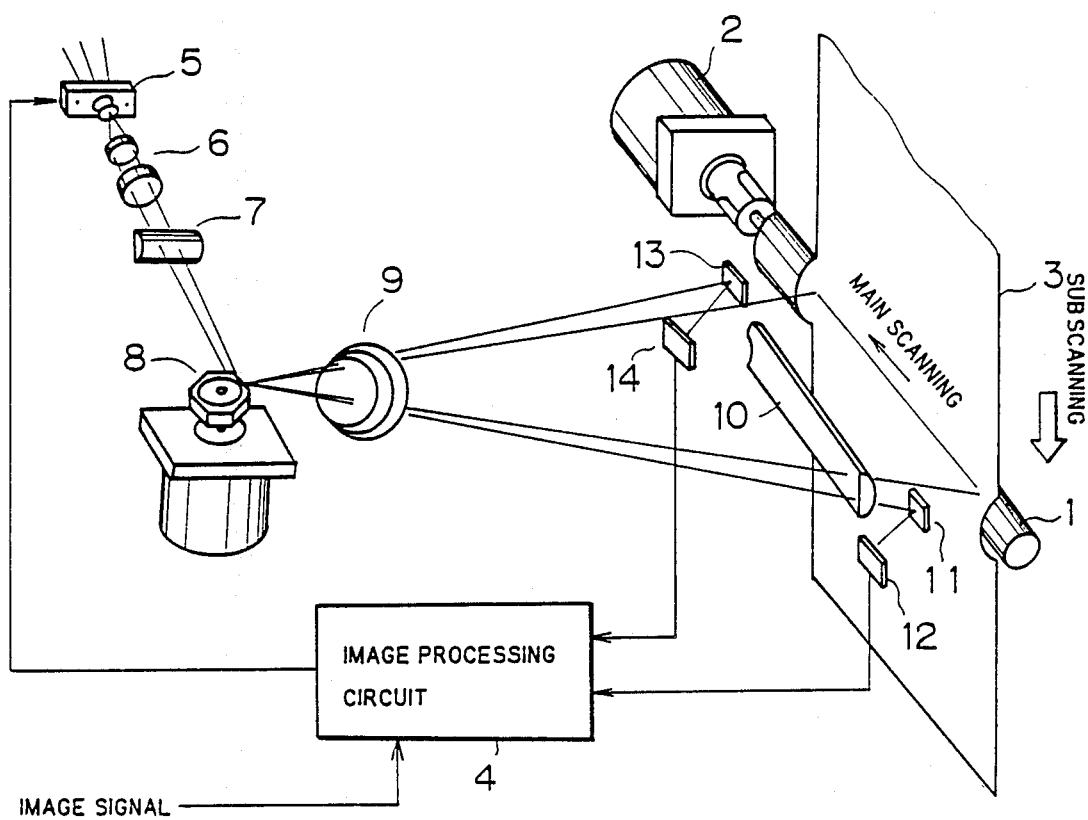
FIG. 5 is a block diagram showing the first embodiment of the present invention.

FIG. 5 is a block diagram showing an embodiment of the present invention for performing the aforementioned crossover correction. Referring to FIG. 5, a film feed roller 1 is rotatingly driven by a subscanning motor 2, whereby a film 3 serving as a recording photosensitive material is fed in a subscanning direction shown by an arrow in the figure. An image processing circuit 4 processes image signals obtained from an input apparatus or the like to output dot signals indicating variable density (including black and white) of respective dots to a semiconductor laser 5 in synchronization with crossover dot recording clock signals internally generated according to the described embodiment. The semiconductor laser 5 outputs a laser beam responsive to the dot signals as received. The laser beam divergently outputted from the semiconductor laser 5 is changed into parallel beam by a collimator lens 6 and corrected by a cylindrical lens 7, in order to be irradiated on reflecting mirror surfaces of a hexahedral polygon mirror 8.

The polygon mirror 8 comprises a hexahedral rotation mirror for reflecting and deflecting the laser beam, to scan one line of a dot train by one reflecting mirror surface. The laser beam reflected and deflected by the polygon mirror 8 is scanned in the main scanning direction on the film 3 through an f $\theta$ lens 9 and a cylindrical lens 10. The f $\theta$ lens 9 is adapted to obtain light collecting points in the same size regardless of positions of the laser beam on the scanning lines so that the spot of the collected light is moved by a certain distance when the polygon mirror is rotated by a certain angle, i.e., to enable scanning on the scanning lines at a constant speed. The cylindrical lens 10 is adapted to perform straightening correction of the laser beams in a subscanning direction similarly to the cylindrical lens 7, which are adapted to compensate straightening errors of the polygon mirror 8 in industrial processing.

A reflecting mirror 11 and a start sensor 12 formed by an optical detector such as a photodiode are provided immediately in front of a main scanning start position in order to detect passage of the laser beam in advance of scanning one scanning line. A reflecting mirror 13 and an end sensor 14 similar to the start sensor 12 are provided immediately at the back of a main scanning end position in order to detect passage of the laser beam after completion of scanning of one scanning line. Detection signals from the sensors 12 and 14 are input to the image processing circuit 4.

Even if the start positions of respective scanning lines are registered or regularized by the start sensor 12 as hereinabove described with reference to the second conventional method, dot misregistration can be caused by the rotational error of the polygon mirror 8 at the terminating end of each scanning line as hereinabove described with reference to FIG. 2(B). The amount of possible dot misregistration at the terminating end of the scanning line is expressed as follows:

$$\Delta Y = L \times J \tag{1}$$

where symbol L indicates the scanning length and symbol J indicates a rotational error (speed regulation). Assuming that, for example, L=200 mm for main-scanning a shorter edge of A4 size and J=0.02% as the rotational error of a commercially available polygon mirror, the amount of dot misregistration at the terminating end of the scanning line is expressed as follows:

$$\Delta Y = 200 \times 0.0002 = 0.04 \text{ mm} \tag{2}$$

Assuming that recording resolution is 1270 lines/inch (diameter d of one dot = 20 $\mu$m), the ratio of the amount of dot misregistration to one dot is as follows:

$$\Delta Y/d = 0.04/0.02 = 2 \tag{3}$$

When misregistration of two dots is caused, linear edges of a recorded image are irregularized to the point of being useless as a line original or a halftone plate. Picture quality is considerably deteriorated for images other than half tone plates.

In the embodiment shown in FIG. 5, therefore, image processing circuit 4 generates N dot recording clock signals $\phi_1$ to $\phi_N$ shown in FIG. 3 in synchronization with the detection output of the start sensor 12 (i.e., to regularize the start positions of the respective scanning lines) while creating the crossover dot recording clock signals $\phi_X$ obtained by starting operation from the selected dot recording clock signal in order to perform crossover correction by a number of times responsive to the amount of dot misregistration. Thus, the start positions of the respective scanning lines are registered or regularized and the dot misregistration at the terminating ends of the scanning lines can be substantially eliminated.

Figure 6:
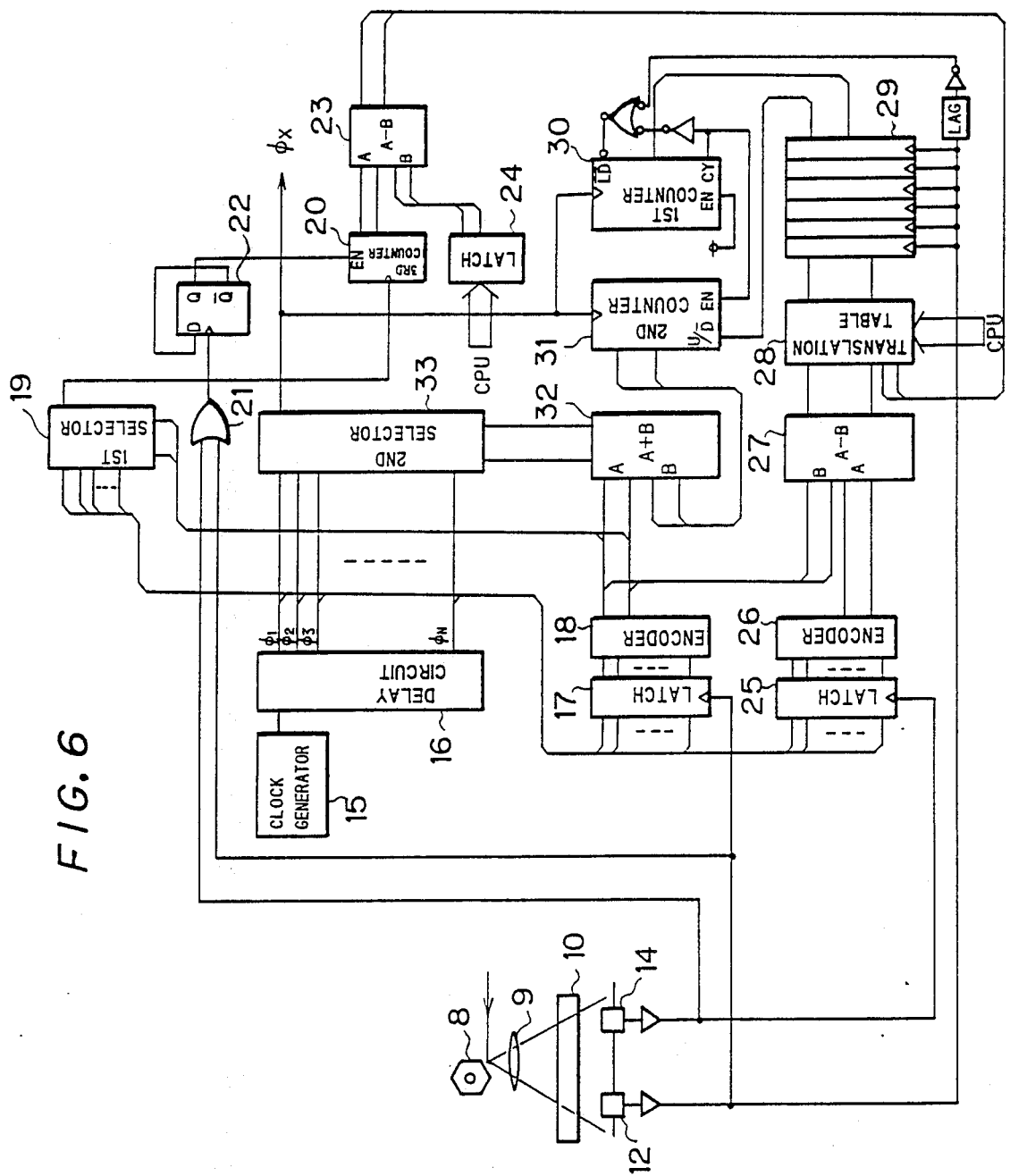
FIG. 6 is a block diagram for creating a crossover dot recording clock signal.

FIG. 6 is a block diagram showing an exemplary circuit for generating the aforementioned crossover dot recording clock signal $\phi_X$ in the image processing circuit 4. A reference dot recording clock signal is generated by a clock generator 15 such as a crystal oscillator and passed through a delay circuit 16, to create the N dot recording clock signals $\phi_1$ to $\phi_N$ by equally dividing the cycle t of the reference dot recording clock signal into N and delaying the same by t/N. Dot recording clock signals $\phi_1$ to $\phi_N$ are employed for creating the crossover dot recording clock signal $\phi_X$, as well as for detecting the amounts of dot misregistration on the respective reflecting mirror surfaces caused by rotational errors of the polygon mirror 8, in this embodiment. As hereinabove described, the time resolution for detection of the dot misregistration amounts is t/N and the length resolution is d/N (d: dot diameter). With reference to a timing chart of FIG. 7, description is now made in detail on detection of dot misregistration.

Figure 7:
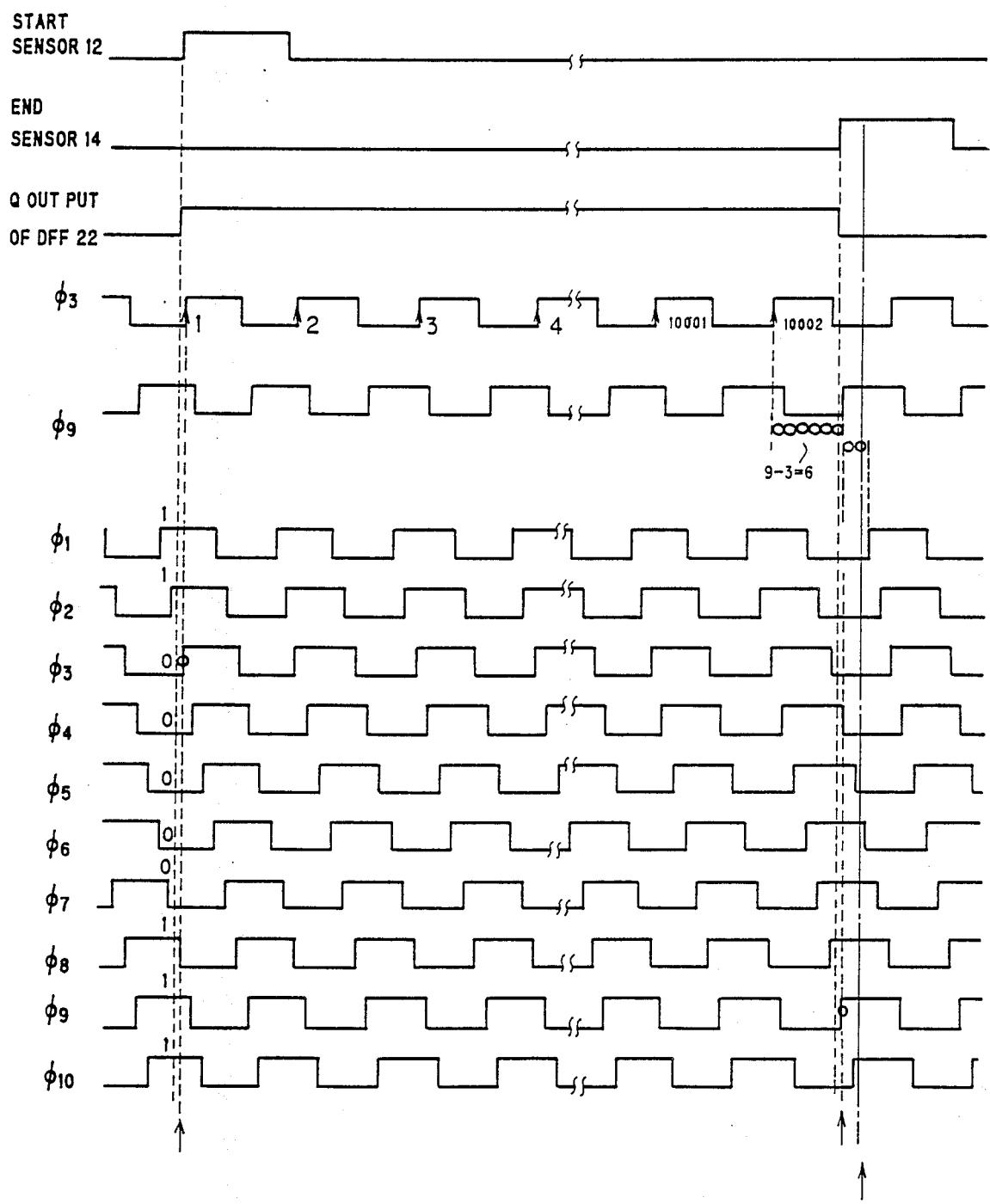
FIG. 7 is an explanatory diagram of detection of the amounts of dot misregistration.

As shown in FIG. 7, detection output of the start sensor 12 is supplied to a clock input of a latch circuit 17, so that current states (1, 1, 0, 0, 0, 0, 0, 1, 1, 1 in FIG. 7) of the dot recording clock signals $\phi_1$ to $\phi_N$ are latched in the latch circuit 17. An encoder 18 encodes the contents latched in the latch circuit 17 to output a signal indicating a sequence number (3 of $\phi_3$ in FIG. 7) of a dot recording clock signal synchronized with the detection output of the start sensor 12 (i.e., rising immediately after the detection output of the start sensor 12 to become "1"). Encoding in the encoder 18 can be performed by identifying, for example, the first occurence of continuous "0" or "0" immediately after continuous "1". Output from the endoder 18 is supplied to a first selector 19, which in turn selects the corresponding dot recording clock signal ($\phi_3$ in case of FIG. 7), to output the same to a third counter 20.

The detection output of the start sensor 12 is also supplied to a clock input of a D flip-flop 22 through an OR gate 21, whereby the Q output of the D flip-flop 22 rises to "1". This Q output is supplied to an enable terminal of the third counter 20, which in turn is activated to count the selected dot recording clock signal ($\phi_3$ in FIG. 7) in response to its leading edge. Thereafter, detection output of the end sensor 14 is supplied to the clock input of the D flip-flop 22 through the OR gate 21, whereby the Q output of the D flip/flop 22 falls to "0". Thus, the third counter 20 is disabled and terminates counting. FIG. 7 shows the case where counting is performed up to 10002. This count value indicates the number of dots that can be recorded between the start sensor position and the end sensor position, whereas such number is not effective since the final one count does not correspond produce a whole dot (i.e., one cycle of the dot recording clock signal) as shown in FIG. 7. This count value is reformed in the manner as hereafter described.

A subtracter 23 receives the count value to subtract a reference count value previously set in a latch circuit 24 through a CPU or the like from the count value. For example, the interval from the start sensor position to the end sensor position is mapped with the shorter edge side of 200 mm of the A4 size, to scan the same in a main scanning direction in resolution of 1270 lines/inch (dot diameter=20 μm). In this case, the standard dot number is:

$$200 \div 0.02 = 10000 \text{ (dots)} \quad (4)$$

whereas the final one count within the count value of the third counter 20 is not effective as hereinabove described, therefore 10001, obtained by adding 1 to the standard dot number of 10000, is set in the latch circuit 24 as a reference count value in order to exclude the final one count by subtraction. Therefore, the result of subtraction by the subtracter 23 is:

$$10002 - 10001 = +1 \quad (5)$$

Thus, it is evident that the amount of dot misregistration in the unit of dot is +1 dot. The + sign means that the rotational speed at the reflecting surface of the polygon mirror 8 is delayed as compared with the standard rotational speed, and therefore the scanning length of one scanning line is shorter than the standard scanning length (terminating end of one scanning line is immediately ahead of 10001th count).

On the other hand, the following processing is performed in order to detect the amount of dot misregistration smaller than one dot by time resolution of t/N (length resolution of d/N in standard rotational speed): The current states of the dot recording clock signals $\phi_1$ to $\phi_N$ are latched in a latch circuit 25 in response to detection output of the end sensor 14 to encode the same by an encoder 26 in order to derive a sequence number (i.e., 9 in FIG. 7) of a dot recording clock signal ($\phi_9$ in FIG. 7) synchronous with the detection output of the end sensor 14. This operation is similar to that in the aforementioned case of deriving the sequence number of the dot recording clock signal synchronous with the detection output of the start sensor 12 by the latch circuit 17 and the encoder 18. A subtracter 27 receives the outputs from the encoders 18 and 26, to subtract the output of the encoder 18 from that of the encoder 26. In the example shown in FIG. 7, the result is:

$$9 - 3 = +6 \quad (6)$$

Thus, it is evident that the amount of dot misregistration smaller than one dot is $(d/10) \times 6$. When the result of subtraction in the subtracter 27 is negative, a number N (10 in FIG. 7) is added to the negative result of subtraction in a translation table 28 (of a subsequent stage) to process the result as a positive value. Assuming that, for example, the detection output of the end sensor 14 is generated as the timing shown by the one-dot chain line, the dot recording clock signal synchronous with this is $\phi_1$ and the result of subtracting the subtracter 27 is $1 - 3 = -2$, while the translation table 28 changes the result into $10 - 2 = 8$, in order to perform processing on the assumption that the amount of dot misregistration smaller than one dot is $(d/10) \times 8$.

The amounts of dot misregistration thus resulting, i.e., the results of subtraction in the subtracters 23 and 27, are translated by using table 28 into data representing crossover timing and crossover phase direction of dot recording clock signals that is required for correcting dot misregistration. The table data are previously set through the CPU or the like.

For example, the manner of obtaining the table data in the case where N is 10 and the standard dot number of one scanning line is 10000 is as follows:

(1) When the result of subtraction in the subtracter 23 is +1 and the subtracter 27 is +6:

The total amount of dot misregistration in this case is $(d/10) \times 16$ since $10 \times 1 + 6 = 16$, therefore, crossover of the dot recording clock signals may be performed 16 times. In order to uniformly perform a crossover of 16 times during one scanning (i.e., 10000 dots), crossover must be performed every 10000/17 dots. Since the result of subtraction in the subtracter 23 is positive and the scanning length of one scanning line is shorter than the standard value as hereinabove described, the crossover phase direction is that of phase lag.

(2) When the result of subtraction in the subtracter 23 is −2 and that in the subtracter 27 is −3:

As hereinabove described, −3 is processed as 7. The total amount of dot misregistration is $(d/10) \times 13$ since $10 \times (-2) + 7 = -13$, whereby crossover may be performed every 10000/14 dots for the reason described in the item (1). Since the result of subtraction in the subtracter 23 is negative and the scanning length of one scanning line is longer than the standard value, the crossover phase direction is that of phase lead.

Symbols of the table data created on the basis of the above are shown as follows: (Symbol INT indicates integral parts and symbols U and D indicate crossover phase directions of phase lag and phase lead respectively.)

| subtracter 23 | subtracter 27 | data |
|---|---|---|
| ... | ... | ... |
| −2 | 8, −2 | INT(10000/13), D |
| −2 | 9, −1 | INT(10000/12), D |
| −1 | 0 | INT(10000/11), D |
| −1 | 1, −9 | INT(10000/10), D |
| ... | ... | ... |
| −1 | 8, −2 | INT(10000/3); D |
| −1 | 9, −1 | INT(10000/2); D |
| 0 | 0 | INT(10000/1) + 1, − |
| 0 | 1, −9 | INT(10000/2); U |
| 0 | 2, −8 | INT(10000/3); U |
| ... | ... | ... |
| 0 | 9, −1 | INT(10000/10), U |
| 1 | 0 | INT(10000/11), U |
| 1 | 1, −9 | INT(10000/12), U |
| 1 | 2, −8 | INT(10000/13), U |
| ... | ... | ... |
| 1 | 9, −1 | INT(10000/20), U |
| 2 | 0 | INT(10000/21), U |
| 2 | 1, −9 | INT(10000/22), U |

When there is no error, a value causing no carry, e.g., INT(10000/1)+1=10001 is located in a first counter 30. Then, no crossover takes place since the output of a second counter 31 remains at zero.

The data of the crossover timing and the crossover phase direction thus obtained are inputted in a shift register 29 and applied to the same reflecting mirror surface of the polygon mirror 8 after one rotation. The shift register 29 then shifts the data in response to a detection output of the start sensor 12, i.e., every 1/6 rotation of the polygon mirror 8, in order to supply the data to the first counter 30 upon one rotation of the polygon mirror 8. It is well known that there is considerable regularity concerning rotational error(s) of each surface of a general polygon mirror, and hence no new errors are introduced even if correction is performed by employing error data of a preceding mirror rotation.

Further operation is described with reference to FIG. 2, on the assumption that INT (12/4)=3 as obtained from the crossover timing and U (lag) is obtained as the crossover phase direction. (This assumption is made in order to facilitate easy understanding of the present invention.) When there is detection output from the start sensor 12 with respect to the same reflecting mirror surface of the polygon mirror 8 after one rotation from the time when the above data was generated, crossover timing =3 is preset in the first counter 30 from the shift register 29, while the data of crossover phase direction = U (lag) is preset in the second counter 31 from the shift register 29. At the same time, the sequence number of the dot recording clock signal synchronous with the detection output of the start sensor 12 is detected by the latch circuit 17 and the encoder 18, as hereinabove described. The following description is made on the assumption that the dot recording clock signal synchronous with the detection output of the start sensor 12 is $\phi_3$ and the sequence number =3 is obtained from the encoder 18.

The counter 31 is reset in a blanking interval from the detection output of the end sensor 14 to precede scanning the detection output of the start sensor 12 of the current scanning, and hence the count output of the second counter 31 is zero at the beginning. The D flip-flop 22 and the third counter 20 are similarly reset in the blanking interval. On the other hand, a load value 3 is loaded in the first counter 30 upon receipt of the detection output from the start sensor 12. Immediately after the detection output of the start sensor 15, therefore, an adder 32 receives value 3 from the encoder 18 and value zero from the second counter 31, and also supplies the value 3 to a second selector 33. The second selector 33 responsively selects $\phi_3$ from the dot recording clock signals $\phi_1$ to $\phi_N$ and outputs the crossover dot recording clock signal $\phi_X$. This crossover dot recording clock signal $\phi_X$ is supplied to clock inputs of the first and second counters 30 and 31. The enable terminal of the second counter 31 is connected to the carry output of the first counter 30 and therefor the second counter 31 is disabled until occurrence of the carry output; hence counting is first performed only by the first counter 30.

The first counter 30 down-counts one by one from the aforementioned preset value 3 for every leading edge of the crossover dot recording clock signal $\phi_X$. The carry output of the first counter 30 rises when the count value reaches 1, whereby the second counter 31 is activated. In response to a subsequent leading edge of the crossover dot recording clock signal $\phi_X$, the second counter 31 up-counts by one from zero, whereby the count value becomes 1. The instruction for the up-counting is supplied by the aforementioned preset data of crossover phase direction =U (lag). If the crossover phase direction =D (lead), down-counting is performed so that the count value becomes −1. The carry output of the first counter 30 falls at the same time when the count value of the second counter 31 becomes 1, whereby the second counter 31 is again disabled, and the preset value 3 is loaded in the first counter 30 on the trailing edge thereof.

When the count value of the second counter 31 is 1, the adder 32 receives 3 and 1, and therefore the added output resulting thereof is 4. The second selector 33 responsively selects the dot recording clock signal $\phi_4$ to output the same as the crossover dot recording signal $\phi^X$. Thus, crossover of adjacent dot recording clock signals in the phase lag direction is performed.

Similar cycles of operation are repeated in order to create the crossover dot recording clock signal $\phi_X$ subjected to crossover in uniform intervals of $\phi_3 \rightarrow \phi_4 \rightarrow \phi_5 \rightarrow \phi_6$ every three cycles (i.e., three dots) of the crossover dot recording clock signal $\phi_X$. The dot misregistration in FIG. 2(B) is eliminated by scanning in synchronization with the crossover dot recording clock signal $\phi_X$, as hereinabove described. Although the 13th dot is a dot recording clock signal $\phi_7$, no influence is exerted by the same since scanning of one scanning line is completed by 12 dots.

Figure 8:
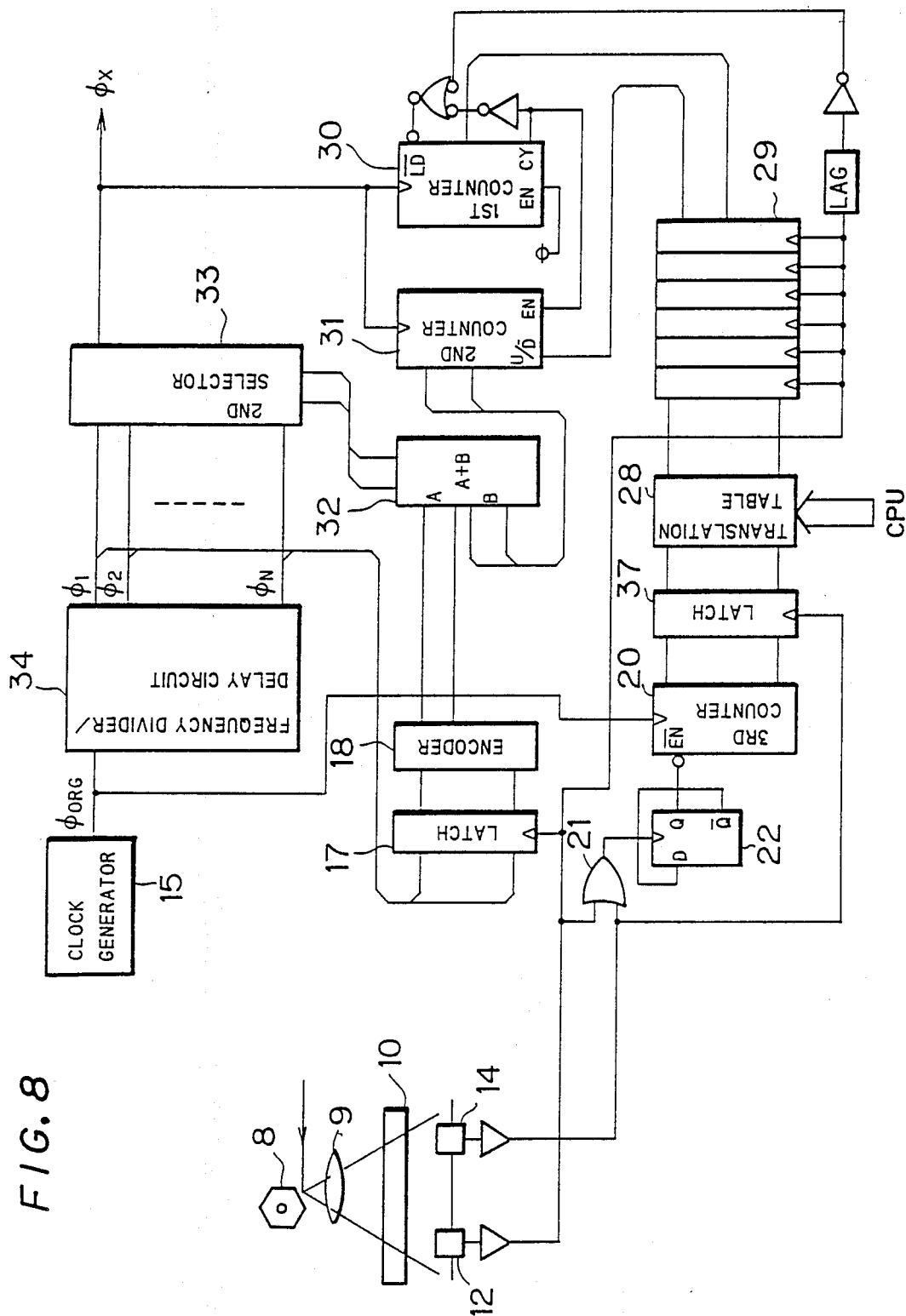
FIG. 8 shows another block diagram for creating the crossover dot recording clock signal.

FIG. 8 is a block diagram showing a modification of the circuit for creating the crossover dot recording clock signal $\phi_X$ in the image processing circuit 4. In this modification, a clock generator 15 generates a clock signal $\phi_{ORG}$ of a frequency N times the dot recording clock signals $\phi_1$ to $\phi_N$ (i.e., cycle t/N) to be frequency-divided and delayed by a frequency divider/delay circuit 34, in order to create N dot recording clock signals $\phi_1$ to $\phi_N$.

Figure 9:
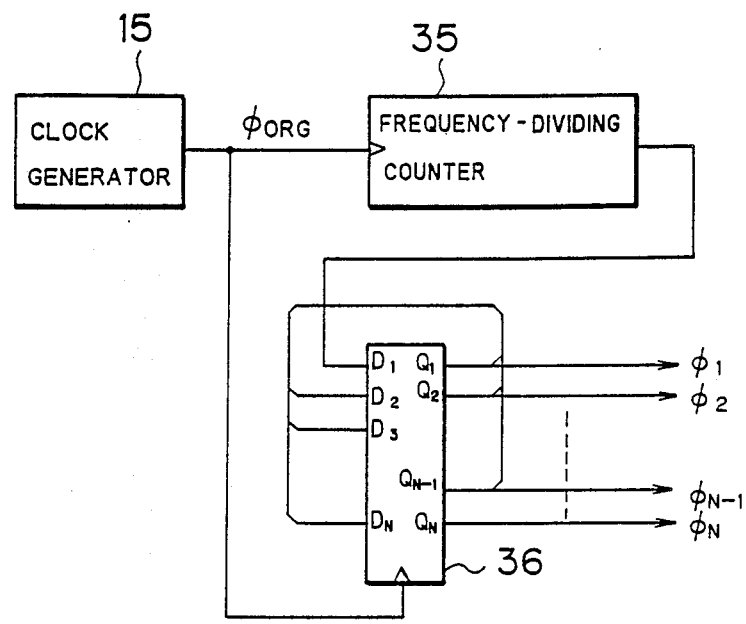
FIG. 9 is a block diagram showing an example of a frequency divider/delay circuit.
Figure 10:
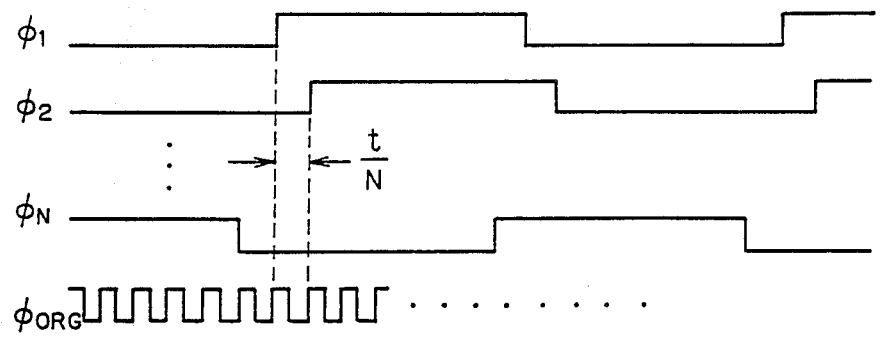
FIG. 10 is a signal waveform diagram showing the operation thereof.

FIG. 9 is a block diagram showing an example of the frequency divider/delay circuit 34. The clock signal $\phi_{ORG}$ from the clock generator 15 is frequency-divided into 1/N by a frequency dividing counter 35. The clock signal thus frequency-divided into 1/N is input to D₁ input of a D flip-flop 31, to be outputted as a dot recording clock signal $\phi_1$ in response to the leading edge of the clock signal $\phi_{ORG}$. The dot recording clock signal $\phi_1$ is also input to D₂ input of the D flip-flop 36, to be outputted as a dot recording clock signal $\phi_2$ in response to a subsequent leading edge of the clock signal $\phi_{ORG}$. Thus, N dot recording clock signals $\phi_1$ to $\phi_N$ delayed by the cycle t/N of the clock signal $\phi_{ORG}$ can be generated. (FIG. 10 illustrates this situation.)

In modification shown in FIG. 8, the third counter 20 receives the clock signal $\phi_{ORG}$ at its clock input and is activated only during the interval between the detection output of the start sensor 12 and that of the end sensor 14 to count the clock signal $\phi_{ORG}$, as hereinabove described with reference to the embodiment of FIG. 5. This count value is latched in a latch circuit 37 in synchronization with the detection output of the end sensor 14. Since the cycle of the clock signal $\phi_{ORG}$ is t/N, the count value of the third counter 20 is a count value by a time resolution of t/N (length resolution in standard rotational speed of the polygon mirror 8 is d/N). Therefore, if there is no dot misregistration when the standard dot number of one scanning line is 10000 for example, the count value of the third counter 20 is 10000 ×N. In other words, 10000 ×N is processed as a reference count value, so that difference between this reference count value and the count value of the third counter 20 indicates the amount of dot misregistration by the length resolution of d/N.

The translation table 28 receives the count value of the third counter 20 latched in the latch circuit 37 and outputs data for crossover timing and crossover phase direction required to eliminate the amount of dot misregistration expressed by the count value. The concept of creation of table data is similar to that in the embodiment of FIG. 6, and examples of the dot number of one scanning line is equal to 10000 and N is equal to 10 are as follows:

| third counter | data |
| --- | --- |
| ... | ... |
| 99989 | INT(10000/12), D |
| 99990 | INT(10000/11), D |
| 99991 | INT(10000/10), D |
| ... | ... |
| 99998 | INT(10000/3), D |
| 99999 | INT(10000/2), D |
| 100000 | INT(10000/1), + 1, — |
| 100001 | INT(10000/2), 2), |
| 100002 | INT(10000/3), U |
| ... | ... |
| 100009 | INT(10000/10), U |
| 100010 | INT(10000/11), U |
| 100011 | INT(10000/12), U |
| 100019 | INT(10000/20), U |
| 100020 | INT(10000/21), U |
| 100021 | INT(10000/22), U |
| ... | ... |

When there is no error, a value causing no carry, e.g., INT(10000/1) +1 =10001 is loaded in the first counter 30, similar to the embodiment of FIG. 6.

This data is supplied to the shift register 29, so that the crossover dot recording clock signal $\phi_X$ is generated similarly to the embodiment of FIG. 6. Then, scanning is performed without dot misregistration by the crossover dot recording signal.

Although crossover for 16 times is performed every 10000/17 dots during scanning when the result of substraction in the substracters 23 and 27 is 16, as, for example, in the embodiment of FIG. 6, crossover may be performed after 10000/36 dots at the beginning to thereafter perform crossover every 10000/16 dots. In this case, first data (10000/32) and second data (10000/16) are inputted in the shift register 29 by the translation table 28 as result of substraction. The first data 10000/32 is loaded in the first counter 30 at the beginning and the second data 10000/16 is loaded in the first counter 30 when a carry is caused from the first counter 30 after starting of recording. When the result of substraction by the substracters 23 and 27 is within ±1, both the first and second data are identical to those as hereinabove described. This also applies to the modification shown in FIG. 8.

Figure 11:
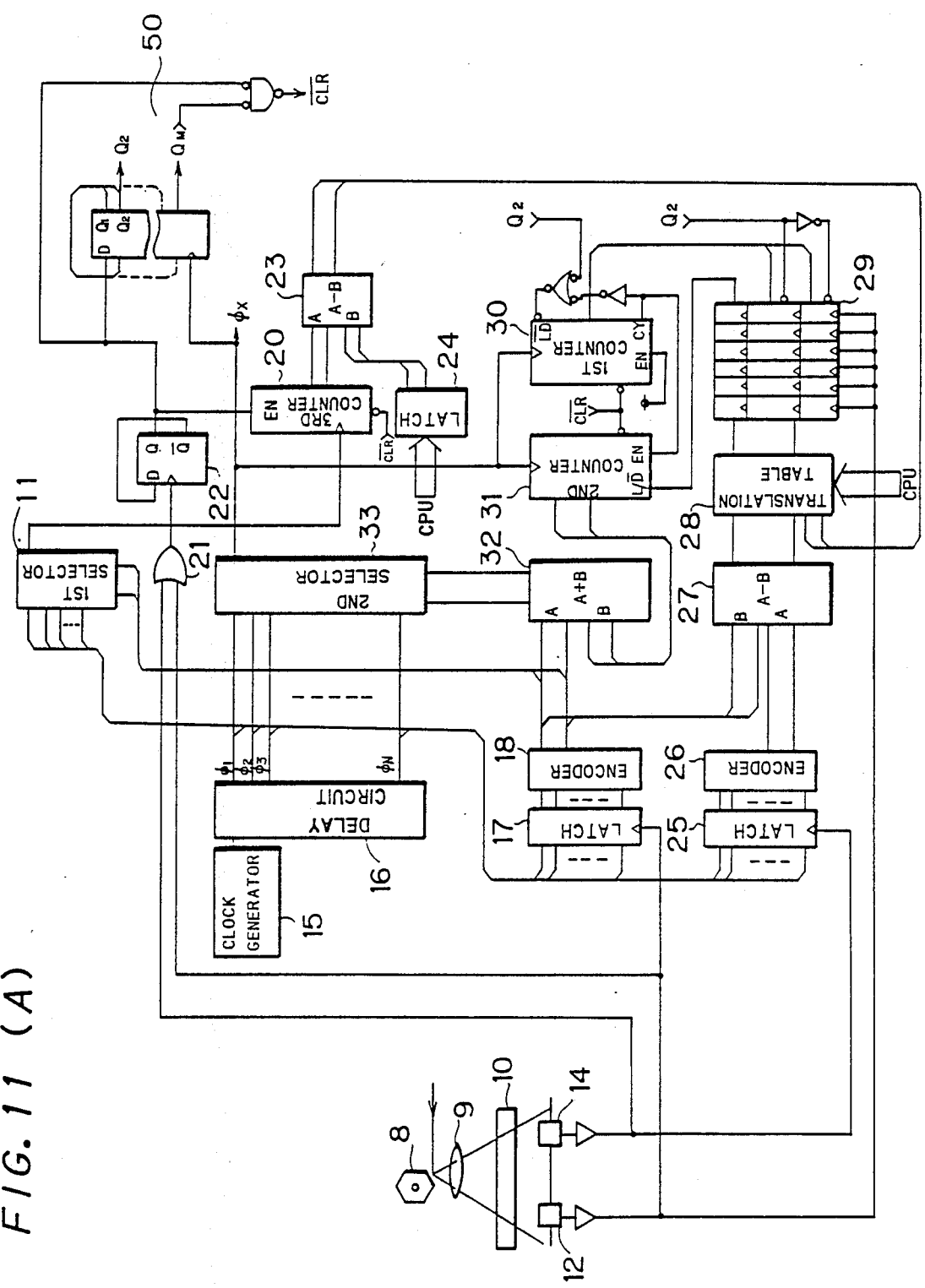
FIGS. 11(a) and 11(b) illustrate a modification of the example shown in FIG. 8.

FIGS. 11(A) and 11(B) shows a modification of this case. The translation table 28 transfers U/D signal and two types of load values to the shift register 29 as hereinabove described with reference to FIG. 6, on the basis of the result in the substracters 23 and 27. Immediately after starting, output Q₂ of a timing circuit 50 goes low at timing shown in FIG. 11(B), and the first counter 30 fetches first data (INT(10000/32) at the timing of $\phi_X$ during this interval. The output Q₂ of the timing circuit 50 goes high when $\phi_X$ continues, and second data (INT(10000/16) is transferred as the load value to the first counter 30. When counting by the first counter 30 continues so that the first counter 30 causes a carry, the second data is loaded in the first counter 30. Thereafter the output Q₂ of the timing circuit 50 holds the high level, whereby the second data is loaded every time a carry occurs.

Although crossover in each of the aforementioned embodiments, and modifications are performed toward adjacent phases, such crossovers may be performed when a phase is excessive by one and remain within a range where the picture quality is not deteriorated. The amount of crossover is reduced by the excess, as a matter of course.

According to the first embodiment of the present invention as hereinabove described, dot misregistration on the scanning lines caused by rotational errors of the polygon mirror can be easily eliminated with simple structure without providing grating or synchronous control circuitry and without requiring a polygon mirror of high accuracy.

Second Embodiment

Figure 12:
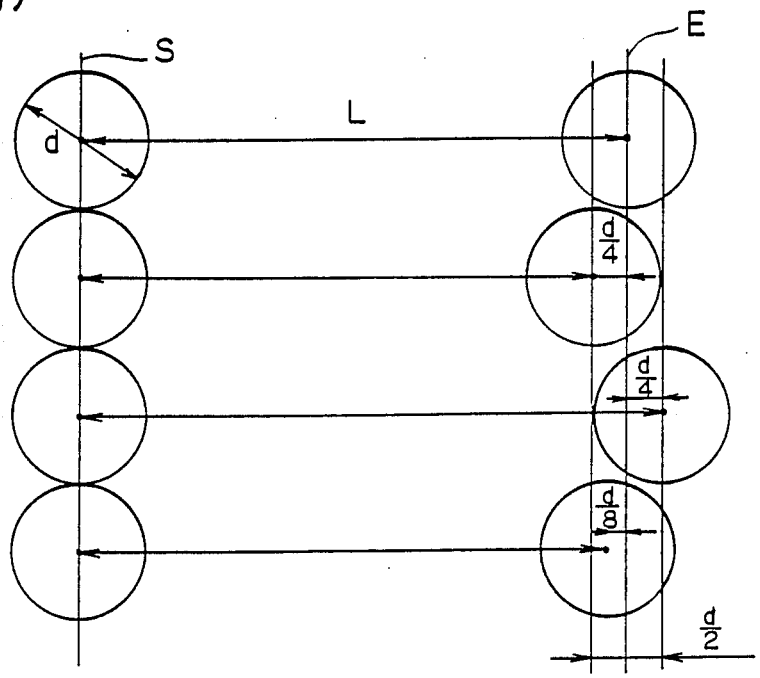
FIGS. 12(a) and 12(b) are explanatory diagrams showing the basic concept of correction according to a second embodiment of the present invention.
Figure 12:
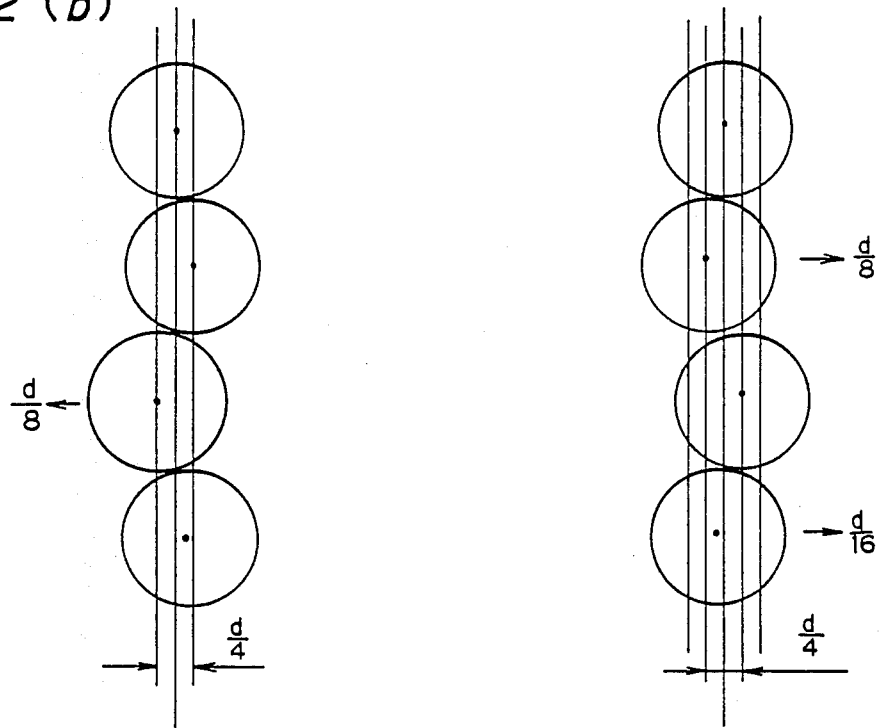

With reference to FIG. 12, description is now made on the basic concept of a second embodiment of the present invention. First, assume the start positions of respective scanning lines are registered by the start sensor 12 as hereinabove with reference to the second conventional method, for example, dot misregistration is caused by rotational error of the polygon mirror 8 at the terminating end of each scanning line as shown in FIG. 12(a). Referring to FIG. 12, symbols S and E denote correct start and end positions (dot center positions) of the scanning lines. The amount ΔY of dot misregistration at the terminating end of the scanning line is expressed as follows:

$$\Delta Y = L \times J \qquad (7)$$

where symbol L indicates scanning length and symbol J indicates rotational error (speed regulation). When L =100 mm and J =0.01%, for example, the amount of dot misregistration at the terminating end of the scanning line is:

$$\Delta Y = 100 \times 0.0001 = 0.01 \text{ mm} \tag{8}$$

Assuming that recording resolution is 1270 lines/inch (diameter d of one dot=20 μm), the ratio of the amount of dot misregistration to one dot is:

$$\Delta Y/d = 0.01/0.02 = \tfrac{1}{2} \tag{9}$$

FIG. 12(a) shows the case of dot misregistration of ½ dot, whose recorded image edges are non-linear and indented. This image cannot be employed for a line original or a halftone plate.

The second embodiment of the present invention reduces dot misregistration by compensating for approximately one half of the dot misregistration caused at the terminating end of the scanning line in a starting point of scanning. For example, the terminating end of the second scanning line shown in FIG. 12(a) is leftwardly misregistered by ¼ dot, and hence the same is rightwardly displaced by half the amount of misregistration, i.e., ⅛ dot from the scanning start position as shown in FIG. 12(b). The terminating end of the third scanning line in FIG. 12(a) is rightwardly misregistered by ¼ dot, and hence the same is leftwardly displaced by half the amount of misregistration, i.e., ⅛ dot from the scanning start position as shown in FIG. 12(b). The scanning start positions are misaligned by this operation, whereas it is obvious that the total amount of dot misregistration is reduced to a half, i.e., ¼ dot. According to this method, the amounts of dot misregistration at the terminating ends of the scanning lines are suppressed to about half that of the prior art at the maximum, while the same are dispersed over the entire screen (particularly in the vicinity of both ends) thereby reducing the amount of dot misregistration as a whole. Such an effect is increased as dot resolution is increased and rotational error accuracy of the polygon mirror is improved, so that apparent picture quality is improved.

In order to implement the aforementioned concept, the embodiment obtains the rotational error times of respective surfaces of the polygon mirror and performs image recording by dot recording clock signals out of phase by about half the error time of each surface of the mirror having a rotational error. The structure shown in FIG. 5 may be employed, and in this case, the image processing circuit 4 receiving the detection signals from the start sensor 12 and the end sensor 14 obtains the rotational error time of each surface of the polygon mirror 8, in order to output a dot signal indicating variable density of each dot to the semiconductor laser 5, for every surface of the polygon mirror 8, synchronization with a dot recording clock signal responsive to the obtained rotational error of each surface of the mirror.

Figure 13:
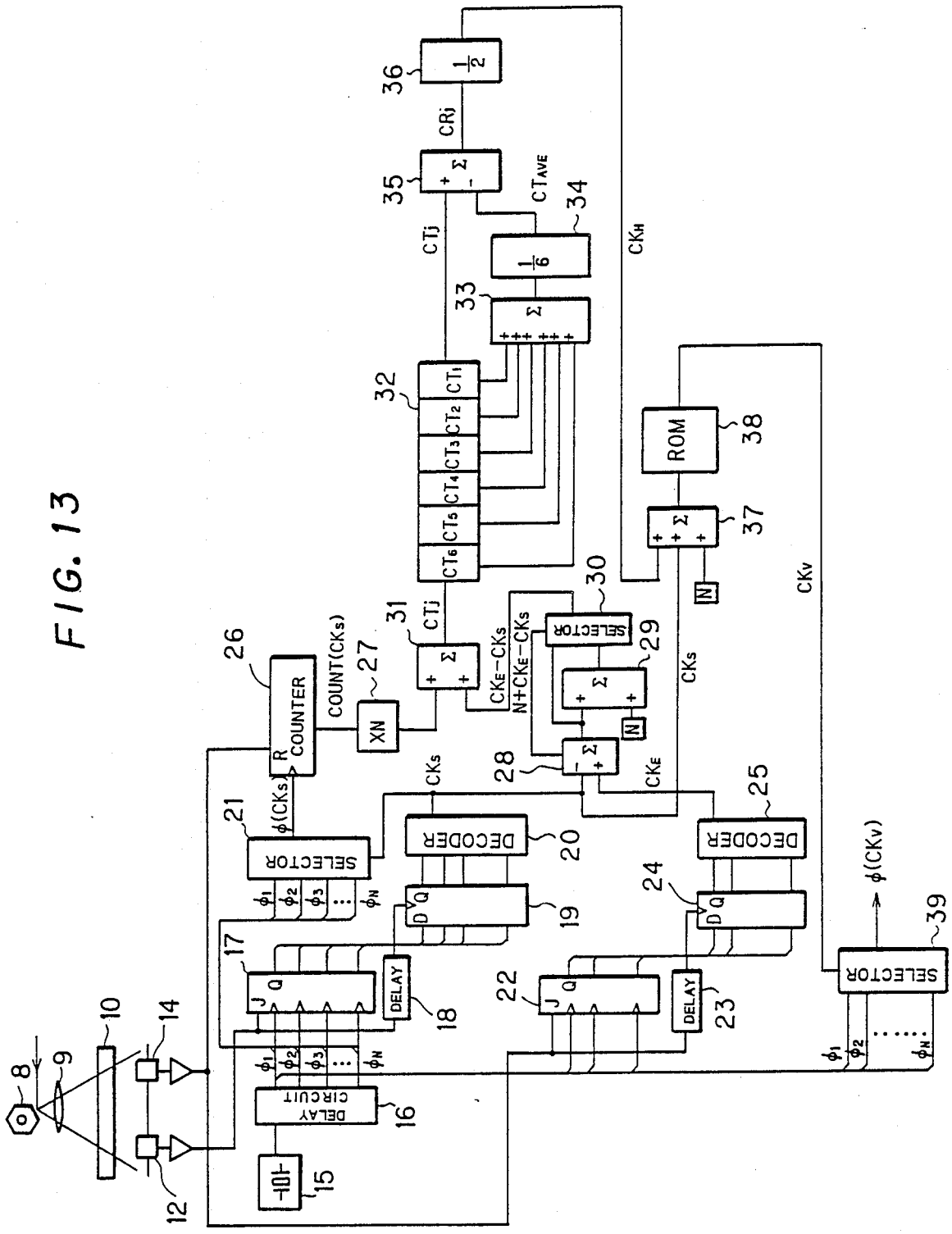
FIG. 13 is a block diagram for generating dot recording clock signals responsive to rotational errors of a polygon mirror.
Figure 14:
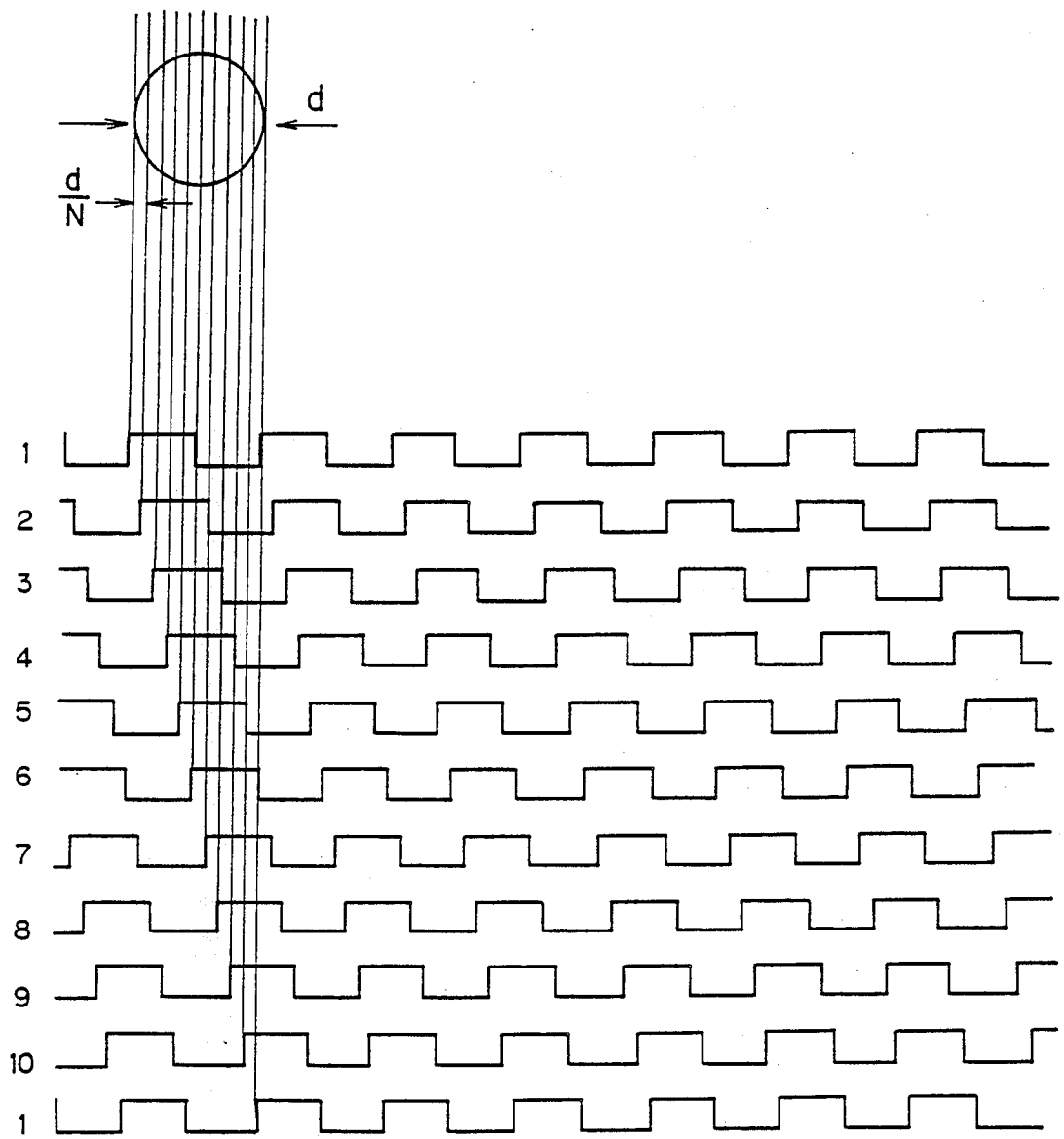
FIG. 14 illustrates the relation between one dot and delayed clock signals.

FIG. 13 is a block diagram showing circuitry of the image processing circuit 4 for generating the dot recording clock signals responsive to the rotational errors of the respective surfaces of the polygon mirror 8. A crystal oscillator 15 generates a reference clock signal, which is passed through a delay circuit 16 so that the cycle t of the reference clock signal is equally divided into N to create N clock signals delayed by t/N. The N clock signals are numbered from 1 to N in sequence from the reference clock signal. FIG. 14 illustrates the case of N=10. Time resolution measurable by employment of the N clock signals is t/N, and length resolution is d/N (assuming that the diameter of one dot is d).

According to the embodiment hereafter described in detail, the aforementioned N clock signals are used to obtain the rotational error factor of the respective reflecting mirror surfaces of the polygon mirror 8 while selecting a clock signal, from the N signals, which is out of phase by ½ of the obtained rotational error times with respect to a clock signal synchronous with detection output of the start sensor 12, to employ te same as a dot recording clock signal.

Figure 15:
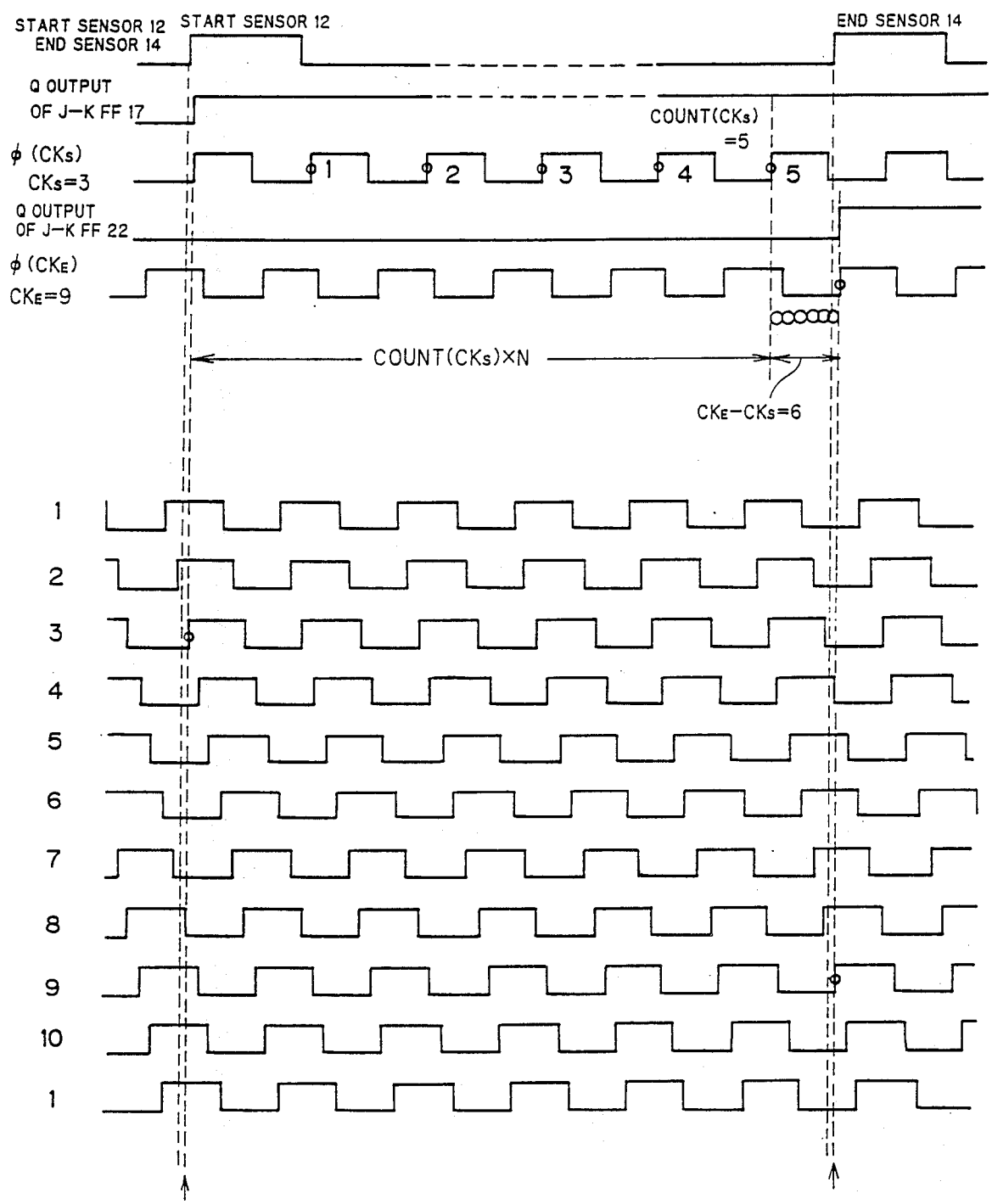
FIG. 15 is an explanatory diagram showing the manner of obtaining the scanning interval between a start sensor and an end sensor.

First, a clock signal synchronous with the detection output of the start sensor 12 is selected form $\phi_1$ to $\phi_N$ in a circuit formed by a J-K flip-flop 17, a delay circuit 18, a D flip-flop 19, a decoder 20 and a selector 21. The operation is as follows:

The J-K flip-flop 17 is reset in a blanking interval preceding scanning and current scanning; for example, to enter a set standby state by receiving the detection output of the start sensor 12 in its J input. Thereafter, Q output corresponding to a first inputted signal of clock signal $\phi_1$ to $\phi_N$ becomes "1", and the current state of the Q output is latched in the D flip-flop 19 by clocking the D flip-flop 19 by a signal generated by delaying the detection output of the start sensor 12 through a delay circuit 18. The decoder 20 decodes the Q output of the D flip-flop 19, and outputs a signal $CK_X$ ($CK_S=1$ to N) representing the number of the clock signal synchronous with the detection output of the start sensor 12. The selector 21 then selects a clock signal $\phi(CK_S)$ corresponding to $CK_S$ from the N clock signals $\phi_1$ to $\phi_N$. FIG. 15 shows an example in which a clock signal of No. 3 ($CK_S=3$) is selected in response to the detection output of the start sensor 12.

On the other hand, a circuit part formed by a J-K flip-flop 22, a delay circuit 23, D flip-flop 24 and a decoder 25 obtains a signal $CK_E$ ($CK_E=1$ to N) representing the number of a clock signal synchronous with the detection output of the end sensor 14. This operation is similar to that for obtaining $CK_S$ as hereinabove described, and hence description thereof is omitted. FIG. 15 shows an example where a clock signal of No. 9 ($DK_S=9$) is selected in response to the detection output of the end sensor 14.

The clock signal $\phi(CK_S)$ selected by the selector 21 is counted by a counter 26 until detection output of the end sensor 14 is generated. Assuming that COUNT($CK_S$) represents the count number, the scanning time T between the start sensor 12 and the end sensor 14 is generated from the same and the aforementioned $CK_S$ and $CK_E$, as follows:

When $CK_S \leq CK_E$, $$T = \text{COUNT}(CK_S) \times t + (CK_E - CK_S) \times t/N \tag{10}$$

when $CK_S > CK_E$, $$\begin{aligned} T &= (\text{COUNT}(CK_S) + 1) \times t - (CK_S - CK_E) \times t/N \\ &= \text{COUNT}(CK_S) \times t + (N + CK_E - CK_S) \times t/N \end{aligned} \tag{11}$$

When the time resolution t/N by the N clock signals is normalized to 1, i.e., when the scanning time is the same in resulution of the numbering of the clock signals, the count value CT of the scanning time can be expressed as follows:

When $CK_S \leq CK_E$, $$CT = T \times N/t = \text{COUNT}(CK_S) \times N + CK_E - CK_S \quad (12)$$

When $CK_S > CK_E$, $$CT = T \times N/t = \text{COUNT}(CK_S) \times N + N + CK_E - CK_S \quad (13)$$

In the example shown in FIG. 15, $\text{COUNT}(CK_S) = 5$, $CK_E - CK_S = 6$ and $N = 10$, and $CT = 56$ from the above expression (12).

In the embodiment shown in FIG. 13, circuitry for generating the above expressions (12) and (13) comprises a multiplier 27, a subtracter 28, an adder 29, a selector 30 and an adder 31. The multiplier 27 multiplies $\text{COUNT}(CK_S)$ outputted from the counter 26 by N, to generate the first terms of the expressions (12) and (13). The subtracter 28 receives the output of the decoder 25, i.e., $CK_E$ in its subtracted input while receiving the output of the decoder 20, i.e., $CK_S$ in its subtracting input and operates $CK_E - CK_S$ thereby and outputs the result to the adder 29 and the selector 30, and outputs a sign indicating negative/positive value of the result of operation to the selector 30. The adder 29 performs adding N, to output $N + CK_E - CK_S$ to the selector 30. The selector 30 selects $CK_E - CK_S$, i.e., the result of the subtractoer 28 when the result of the subtracter 28 is positive or zero. i.e., when $CK_S > CK_E$ to output the same, while selecting $N + CK_E - CK_S$, i.e., the result of the adder 29 when $CK_S > CK_E$ to output the same. The adder 31 adds up the output of the multiplier 27 and that of the selector 30, thereby obtaining the scanning time count value CT by the aforementioned expressions (12) and (13).

The scanning time count value CT is compared with a standard count value $CT_N$, to recognize rotation error times of the respective surfaces of the polygon mirror 8. In this embodiment, an average value $CT_{AVE}$ of six scanning time count values CT obtained by one rotation of the polygon mirror 8 is employed as the standard count value $CT_N$. Assuming that the obtained scanning time count values Ct are $CT_1, CT_2, \ldots CT_6$ in sequence, $$CT_{AVE} = (CT_1 + \ldots + CT_{t6})/6 \quad (14)$$

In general, M (M:integral multiple of the surface number of the polygon mirror 8) of $CT_j$ corresponding to an arbitrary rotation number of the polygon mirror 8 can be averaged so that:

$$CT_{AVE} = \frac{1}{M} \sum_{j=1}^{M} CT_j \quad (15)$$

Differences between the average value $CT_{AVE}$ and the respective $CT_j$ indicate the rotational error times in the respective surfaces of the polygon mirror 8, and assuming that the count values of the rotational error times are expressed by $CR_h$, $$CR_j = CT_j - DT_{AVE} \quad (16)$$

In the embodiment shown in FIG. 13, circuitry for generating the expressions (14) and (16) comprises a shift register 32, a summing circuit 33, a divider 34 and a subtracter 35. The shift register 32 receives $CT_j$ as the results of operation of the adder 31 and stores six of the same while shifting the same, and the shifted $CT_j$ are supplied to the subtracted input of the subtracter 35. The summing circuit 33 sums up the continuous six $CT_j$ stored in the shift register 32, so that $CT_{AVE}$ of the expression (14) is obtained by dividing the same into 1/6 by the divider 34. The $CT_{AVE}$ is supplied to the subtracting input of the subtracter 35, which in turn generates $CT_j - CT_{AVE}$ of the expression (16). Thus, the count values $CR_j$ of the rotational error times of the polygon mirror 8 are obtained.

The count value $CR_j$ corresponds to the corresponding surface in the preceding rotation of the polygon mirror 8, and it is well known there is considerable regularity with respect to rotational error(s) of each surface in general rotation of a polygon mirror, whereby no new error(s) is introduced by employing the data of rotational error times of a preceding rotation.

If $CR_j > 0$, the scanning time between the start sensor 12 and the end sensor 14 is longer than the standard value (i.e., rotation of the polygon mirror 8 is delayed), and the scanning length for one scanning line recording is shorter than the standard level, as shown in the second line in FIG. 12(a). When $CR_j < 0$, on the other hand, the scanning length for one scanning line recording is longer than the standard level, as shown in the third line of FIG. 12(a). Therefore, the direction for reducing the dot misregistration caused by rotational errors of the polygon mirror 8 is rightward direction (in FIG. 13) i.d., phase shift in a positive direction in dot recording clock signal when $CR_j > 0$, while the phase shift is to negative contrary when $CR_j < 0$.

Assuming that $CK_H$ represents the count value of phase correction for finding a clock signal phase-shifted in a direction for reducing the dot misregistration caused by error by ½ of the rotational error time of the polygon mirror 8, the following expression holds:

$$CK_H = \tfrac{1}{2} \cdot CR_j \quad (17)$$

Therefore, an identification number $CK_V$ for a clock signal to be selected as the dot recording clock signal (one of $\phi_1$ to $\phi_N$) is obtained by the following expressions:

$$CK_V = (N + CK_S + CK_H) \bmod N \quad (18)$$

N is added for operation in situations where the value of $CK_S + CH_H$ is negative, while the remainder in the division by N is obtained since assumed is such case where the amount of dot misregistration is within one dot.

In the embodiment shown in FIG. 13, circuitry for generating the above expressions (17) and (18) comprises a divider 36, a summing circuit 37 and a ROM 38. The divider 36 divides $CR_j$ outputted from the subtracter 35 by ½ to generate $CK_H$ of the expression (17), and outputs the same to the summing circuit 37. The summing circuit 37 receives $CK_H$, $CK_S$ outputted from the decoder 20 and the constant N and sums up the same to generate $N + CK_S + CK_H$. On the other hand, the result of operation of $(N + CK_S + CK_H) \bmod N$ in the expression (18) is written in a look-up table in the ROM 38, which in turn receives output from the summing circuit 37, to read corresponding $CK_V$.

Figure 16:
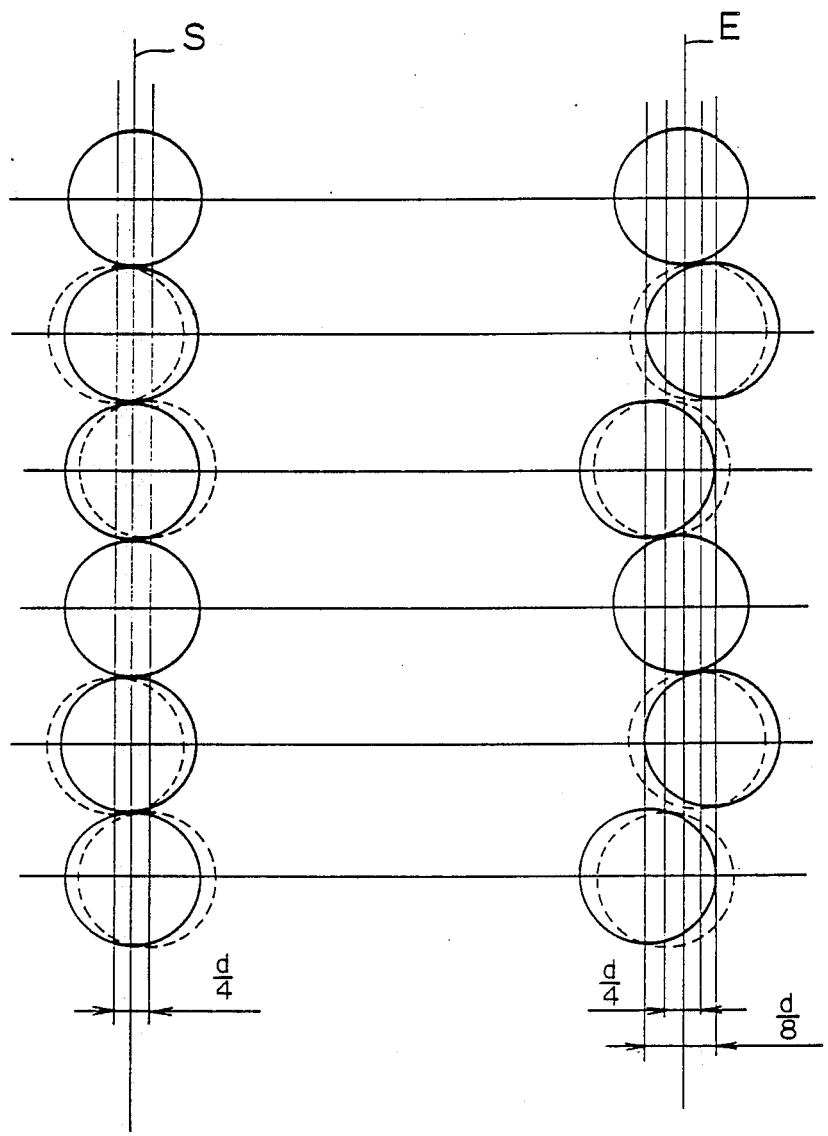
FIG. 16 illustrates the result of correction according to the present invention.

The $CK_V$ thus obtained is input to a selecter 39, which in turn outputs a clock signal $\phi NCK_V$ corresponding to $CK_V$ from the N clock signals $\phi_1$ to $\phi_N$ as the dot recording clock signal. The image processing circuit of FIG. 13 outputs a dot signal representing variable density of each dot in synchronization with the dot recording clock signal $\phi(CK_V)$ is thus input to the semiconductor laser 5. Thus, as shown by dotted lines in FIG. 16, the scanning lines causing dot misregistration are entirely shifted by half the amounts of misregistration, thereby reducing the total amount of dot misregistration. Referring to FIG. 16, dot misregistration of $(\frac{1}{2})\cdot d$ is corrected by the present invention so that the amount of total dot misregistration is reduced to $(\frac{1}{4})\cdot d$. The dot misregistration is substantially zero at the center of the screen. The present invention is applicable to both on-off modulation and continuous modulation.

According to the second embodiment as hereinabove described, dot misregistration of scanning lines caused by rotational errors of a polygon mirror can be easily reduced with simple structure without providing grating or synchronous control circuitry and without requiring extremely accurate polygon mirrors. Further, the dot misregistration is substantially zero at the center of the screen.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method of performing polygon mirror image recording jitter correction by using a polygon mirror to scan a recording beam modulated in synchronization with a dot recording clock signal for recording an image on a photosensitive material, said method comprising the steps of:

generating a plurality N of dot recording clock signals by delaying a dot recording clock signal of a cycle time t by t/N;

detecting said recording beam by a start sensor in advance of scanning one scanning line;

detecting passage of said recording beam after completion of said scanning of one scanning line by an end sensor;

counting an interval between detection times when said beam impinges on said start and end sensors with a time resolution of t/N for each surface of said polygon mirror to obtain a difference between a counted value and a prescribed reference count value as a number of clock crossover times with a sign of said difference as a crossover phase direction;

selecting one of said N dot recording clock signals in synchronization with a detection output of said start sensor for each surface of said polygon mirror;

generating a crossover dot recording clock signal by performing a crossover correction from said selected dot recording clock signal sequentially to a dot recording clock signal adjacent in phase to said selected dot recording clock signal by said number of clock crossover times in said crossover phase direction; and performing image recording by said crossover dot recording clock signal.

2. A method of jitter correction of a polygon mirror in accordance with claim 1, including the steps of:

storing said number of clock crossover times and said crossover phase direction obtained; and generating said crossover dot recording clock signal on the basis of storing said number of clock crossover times and said crossover phase direction after one rotation of said polygon mirror.

3. A method of jitter correction of a polygon mirror in accordance with claim 1, further including the steps of:

counting a first one of said N dot recording clock signals selected in synchroniztion with said detection output of said start sensor until a detection output is generated by said end sensor to obtain a count difference between said counted value and a prescribed reference count value; and obtaining a sequence number differences between a second one of said N dot recording clock signals selected in synchronization with said detection output of said end sensor and said first dot recording clock signal to obtain said number of clock crossover times and said crossover phase direction on the basis of said count difference and said sequence number difference.

4. A method of jitter correction of a polygon mirror in accordance with claim 1, further including the steps of:

frequency-dividing a clock signal having a frequency N times that of said dot recording clock signal into 1/N while shifting said dot recording clock signal cycle by cycle to create N dot recording clock signals; and counting said clock signal having said frequency of N times during the interval between said detection of outputs of said start sensor and said end sensor to obtain said number of clock crossover times and said crossover phase direction on the basis of the difference between the counted value and a reference count value and a sign of said difference.

5. An apparatus for jitter correction of a polygon mirror for performing image recording on a photosensitive material by a scanning recording beam deflected by said mirror and modulated in synchronization with a dot recording clock signal, said apparatus comprising:

means for generating a plurality N of dot recording clock signals by equally dividing a cycle time t of said dot recording clock signal and delaying said dot recording clock signal by t/N.

a start sensor for detecting passage of said recording beam in advance to scanning of one scanning line;

an end sensor for detecting passage of said recording beam after completion of scanning of one scanning line;

means for counting an interval between detection times when said beam crosses said start and end sensors in a time resolution of t/N for each surface of said polygon mirror thereby to obtain a number of clock crossover times and a crossover phase direction from a difference between a counted value and a reference count value and a sign of said difference, respectively;

means for selecting one of said N dot recording clock signals in synchronization with a detection output of said start sensor for each surface of said polygon mirror;

means for performing crossover from said selected dot recording clock signal in said crossover phase direction sequentially to adjacent dot recording clock signals by said number of clock crossover times to thereby create a crossover dot recording clock signal; and means for performing image recording by said created crossover dot recording clock signal.

6. An apparatus for jitter correction of a polygon mirror in accordance with claim 5, further including:
   means for storing said number of clock crossover times and said crossover phase direction as obtained; and
   means for obtaining said crossover dot recording clock signal on the basis of said stored number of clock crossover times and said crossover phase direction of scanning by the same surface after one rotation of said polygon mirror.

7. An apparatus for jitter correction of a polygon mirror in accordance with claim 5, further including:
   means for counting a first one of said N dot recording clock signals selected in synchronization with detection output of said start sensor until detection output is generated by said end sensor thereby to obtain a count difference between said counted value and a prescribed reference counted value; and
   means for obtaining a sequence number difference between a second one of said N dot recording clock signals selected in synchronization with detection output of said end sensor and said first dot recording clock signal to thereby obtain said number of clock crossover times and said crossover phase direction on the basis of said count difference and said sequence number difference.

8. An apparatus for jitter correction of a polygon mirror in accordance with claim 5, further including;
   means for creating N dot recording clock signals by frequency-dividing a clock signal having a frequency N times that of said dot recording clock signal into 1/N while shifting the said dot recording clock signal cycle by clcle; and
   means for counting said clock signal of said frequency of N times in the interval between said detection output of said start sensor and that of said end sensor thereby to obtain said number of clock crossover times and said crossover phase direction on the basis of the difference between said count value and a reference count value and a sign of said difference.

* * * * *